UNITED STATES PATENT OFFICE.

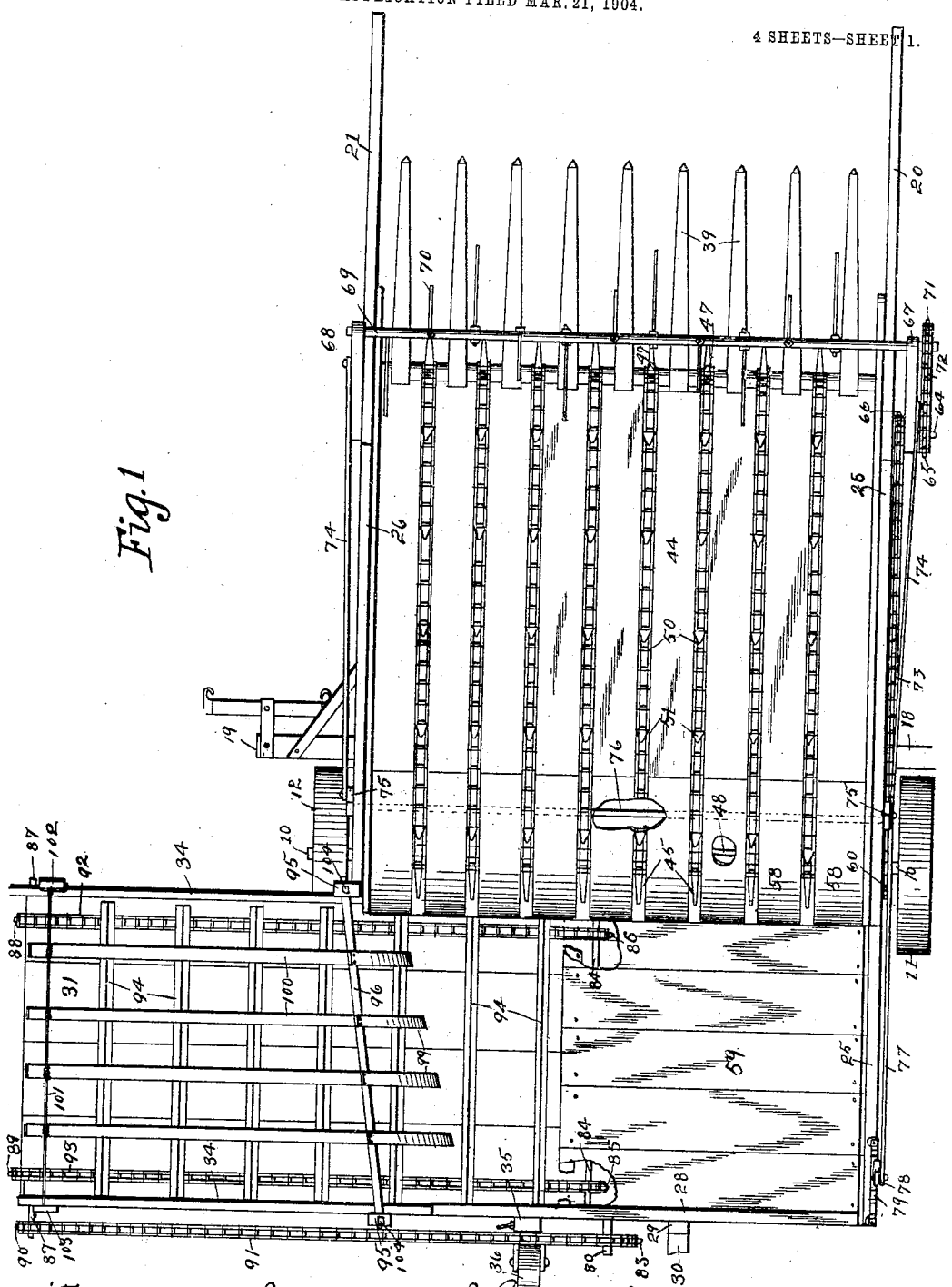

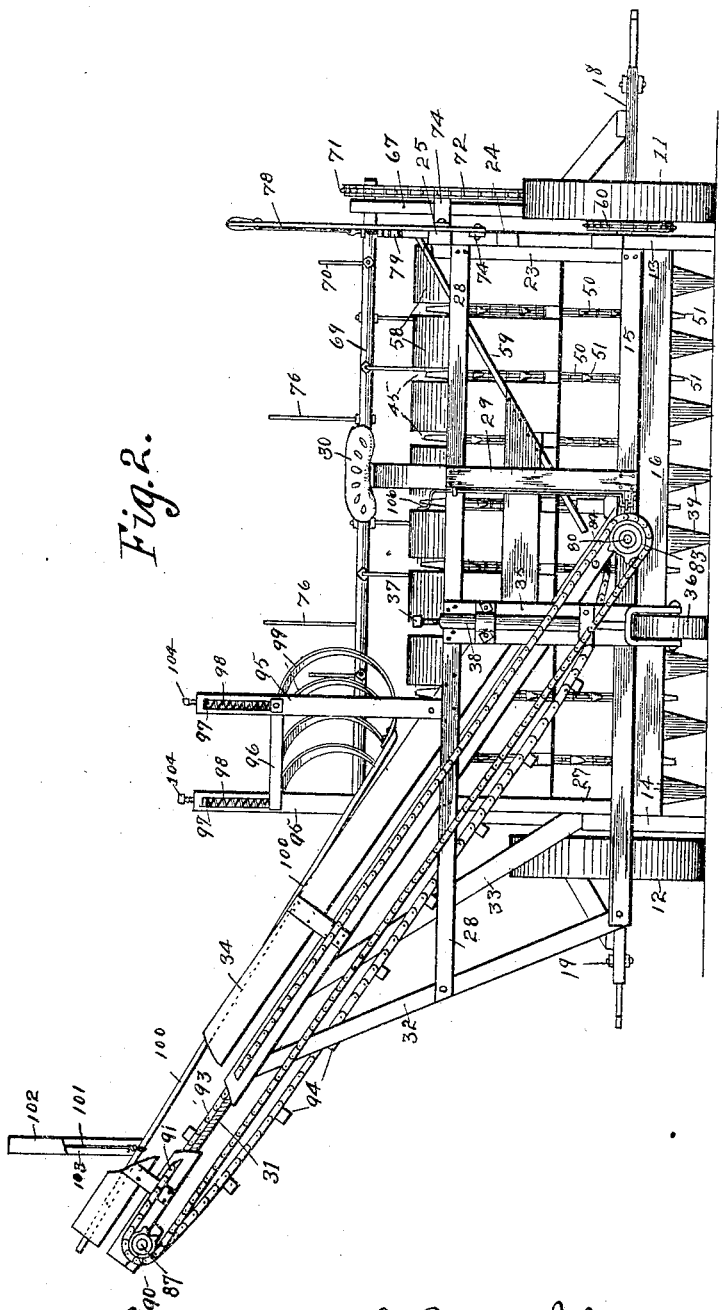

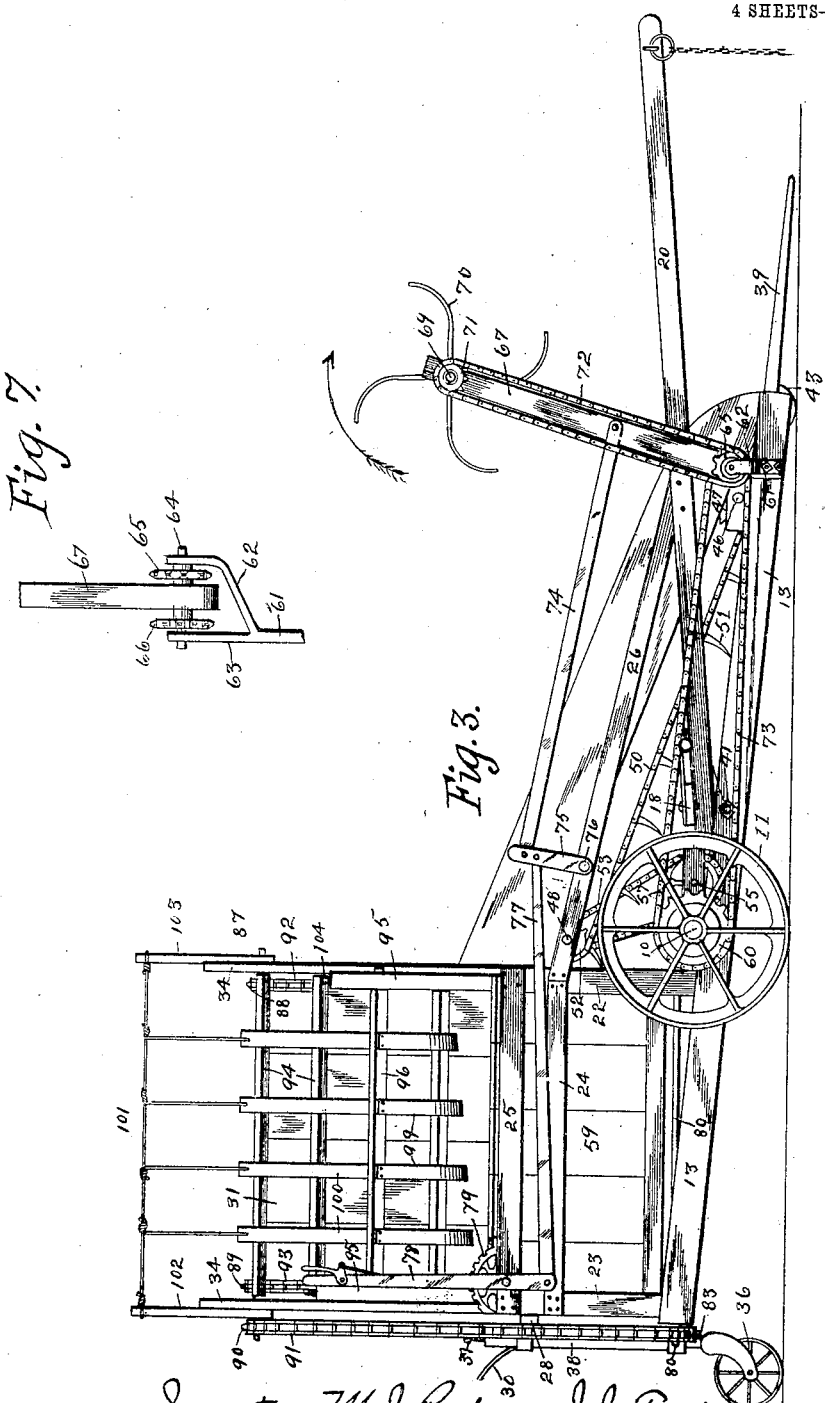

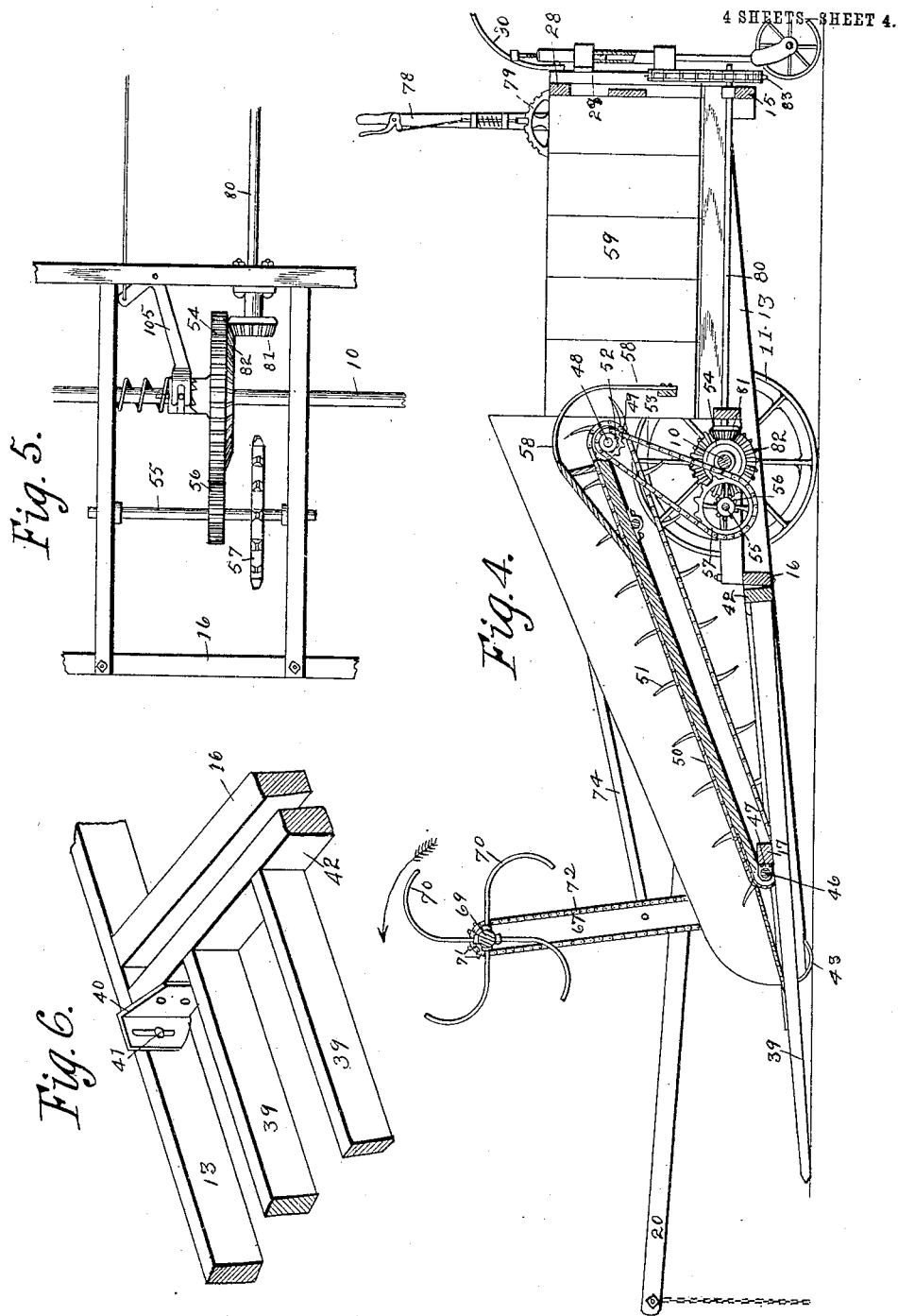

MICHAEL J. RODNEY AND JAMES J. FORD, OF FORT DODGE, AND FRANK M. CONROY, ABRAHAM BURSON, AND FRED W. FITCH, OF FONDA, IOWA.

GRAIN-SHOCK AND HAY LOADER.

No. 810,511.   Specification of Letters Patent.   Patented Jan. 23, 1906.

Application filed March 21, 1904. Serial No. 199,297.

*To all whom it may concern:*

Be it known that we, MICHAEL J. RODNEY and JAMES J. FORD, residing at Fort Dodge, in the county of Webster, and FRANK M.
CONROY, ABRAHAM BURSON, and FRED W. FITCH, residing at Fonda, in the county of Pocahontas, State of Iowa, citizens of the United States, have invented certain new and useful Improvements in Grain - Shock and Hay Loaders, of which the following is a specification.

The objects of our invention are to provide a loader of comparatively simple construction, which shall be durable and which will take the grain from the shock as our machine is advanced over the ground-surface and elevate it rearwardly some distance and then elevate it upwardly and to one side of the line of advance of the machine over the ground-surface, and, further, to provide runners at the forward end of the machine which will pass beneath the shock of grain as they are advanced over the ground-surface, and to provide a mechanism some distance above these runners which will cause the shocks of grain to be thrown rearwardly and downwardly onto conveyers behind the runners in such a way that the kernels of grain will not be shaken from the heads while being loaded by our machine.

A further object is to provide a shock and grain loader to which the draft-animals are so attached that there will be but little if any side draft on the machine while it is being operated.

A further object is to provide runners which can be easily and readily adjusted, so that they will engage the ground-surface or be some distance above it at their forward ends.

A further and very material object is to provide a mechanism mounted at the forward end of the machine and above the runners for throwing the grain rearwardly and downwardly upon the conveyers behind the runners and which can be readily and easily adjusted by the operator who is at the rear of the machine, so as to accommodate a large or small shock of grain.
A further object is to provide an elevating-conveyer which carries the grain upwardly and to one side of the machine-frame with retaining-bars above it, so arranged that the shocks of grain will be prevented from falling back while they are advanced, and also be prevented from getting over the sides of the conveyer while they are being elevated.

A further object is to provide means for throwing the machine into and out of gear readily from the operator's seat while it is in operation.

Our invention consists in certain details in the construction, arrangement, and combination of the various parts of the device, whereby the objects contemplated are attained, as hereinafter more fully set forth, pointed out in our claims, and illustrated in the accompanying drawings, in which—

Figure 1 is a top or plan view of the machine. Fig. 2 is a rear elevation of our device. Fig. 3 is a side elevation looking from the right side of the machine. Fig. 4 is a longitudinal sectional view of the machine looking at said section from the left side of the machine. Fig. 5 is a plan view of the mechanism for throwing the device in and out of gear and the gear-wheels adjacent to it. Fig. 6 is a detail view of the rear end of the runners, showing the way in which these runners can be adjusted at their rear end; and Fig. 7 is a detail view of the bracket which is mounted at the front end and on the right side of the machine for holding in position the sprocket-wheels around which the chains are mounted which drive the gathering-arms.
Referring to the accompanying drawings, it will be seen that we have provided a frame having a shaft 10 extending across it and having the wheels 11 and 12 mounted on each end of said shaft upon which the entire mechanism of our device is mounted. Extending at right angles to the shaft and mounted on it are the side pieces 13 and 14, and these side pieces are connected at their rear ends by the cross-piece 15, at their middle portions by the cross-piece 16, and at their forward ends by the cross-piece 17. Extending outwardly from and attached to the side pieces 13 and 14 are the braces 18 and 19, and these braces come immediately in front of the wheels 11 and 12, respectively. To these braces the whiffletrees to which the draft-animals are to be attached are connected, so that one of the draft-animals is on one side of the frame and the other draft-animal on the other side of the frame, and each of them being immediately in front of the draft-wheels, so that a direct pull is had immediately in front of each of the wheels, and thus a side draft will be prevented when the machine is in operation.

Attached to the side pieces 13 and 14 are the guide-bars 20 and 21, respectively, to which the draft-animals are to be hitched when they are being used on the machine, so that they can be easily guided by the person on the operator's seat. These guide-poles extend upwardly and forwardly from their points of attachment to the side pieces which are adjacent to each of the wheels. Extending upwardly from that portion of the side piece 13 which is behind the wheel 11 are the posts 22 and 23, which are connected at their upper ends by the pieces 24 and 25. The post 22 is also connected with the pole 20 by means of the brace 26, which makes the right side of the frame perfectly rigid. Extending upwardly from the side piece 14 and behind the wheel 12 are the posts 27, which are similar to the posts 22 and 23. Connecting the posts 23 and the rear post 27 is a bar 28, which forms the upper rear portion of the frame. There is a brace on the left side of the machine connecting the forward post 27 with the pole 21 to hold said parts rigidly in position relative to each other and to brace the frame.

Connecting the rear portions of the rear end piece 15 and the bar 28 is the seat-support 29, to which the seat 30 is attached. Extending upwardly from the rear central portion of the frame which is formed by the side pieces 13 and 14 and the cross-piece connecting these side pieces is a frame 31, upon which the elevating and side-delivery conveyer is to be mounted. This frame is supported by the braces 32 and 33 and has a side board 34 on each side of it and extending upwardly therefrom. A further description of this frame is deemed unnecessary, as it is of the ordinary construction with boards forming its central portion and side pieces at the edges of the said boards.

Connecting the part 28 with the rear end piece 15 is a connecting-piece 35, to which the caster 36 is adjustably attached, there being a set-screw 37 in the cylinder 38 in which the caster-support is mounted, so that by screwing or unscrewing the set-screw 37 the caster is moved downwardly or is allowed to move upwardly, and thus allow the rear end of the frame to be more or less distant from the ground-surface. The brace 17, which extends across the frame, is pivotally mounted to said frame. Firmly attached to this brace 17 at its central portion and extending longitudinally of the side pieces 13 and 14 and between said side pieces is a series of runners 39, which extends forwardly from the frame a considerable distance beyond the side pieces 13 and 14, and as the machine is advanced over the ground-surface the runners 39 are designed to pass under the shock of grain, and thus said shock will be elevated slightly. The runners are pointed at their forward end, so that this result will be easily accomplished. The rear ends of the runners are capable of adjustment by means of the iron brace 40, which is attached to them, and the bolt 41, which is designed to hold the brace 40 in position relative to the side pieces 13 and 14, the brace 40 having a slot in it, so that it will be held in any position when the head of the bolt rests against the interior of said brace, and is maintained firmly against the brace by the nut being screwed tightly against the outside of the side piece which is adjacent to it. Thus by adjusting the rear ends of the runners 39 upwardly and downwardly it can be easily accomplished by their being attached together at their rear ends by the cross-piece 42. The forward ends of the runners will be raised or lowered from the ground-surface in order to accomplish the work which is desired for them.

The extreme forward ends of the side pieces 13 and 14 are rounded and each has a metal shoe 43, which is designed to engage the ground-surface as the machine passes over it, and thus prevent the runners from sticking into the ground as they pass over it and also to keep the machine in position relative to the ground-surface.

Partially above the runners and between the sides of the frame is a series of inclined boards 44, which form a portion of the conveyer which is designed to elevate the shocks of grain and force them rearwardly and upwardly as the machine is advanced over the ground-surface. These boards are mounted some distance apart, leaving a series of openings 45 between them. Extending across the frame and mounted above the sides 13 and 14 is a shaft 46, having a series of sprocket-wheels 47 mounted thereon, one of said wheels being in each of the openings 45 between the boards 44. Extending across the frame of the machine above the sides 13 and 14 and rotatably mounted in the braces 26 is a shaft 48, having a series of sprocket-wheels 49 mounted thereon in such a way that each of these wheels is in one of the openings 45 between the boards 44. Passing around each pair of sprocket-wheels which is in each of the openings 45 on the shafts 46 and 48, respectively, is a sprocket-chain 50, having the upwardly-projecting prongs 51 thereon, said prongs being so arranged that they project a slight distance forwardly from their points of attachment to the sprocket-chain 50 when they are above the boards 44. Mounted on the shaft 48 and between two of the sprocket-wheels 49 is a sprocket-wheel 52, which is designed to be driven by the sprocket-chain 53, which passes over it.

Mounted on the main driving-shaft 10 and immediately inside of the side 13 of the frame is a gear-wheel 54. Extending across and mounted above the frame is a shaft 55, upon which a gear-wheel 56 is mounted which is in mesh with the gear-wheel 54 on the main driving-shaft 10. Firmly attached to the gear-wheel 56 and inside of it is the sprocket-wheel 57, around which the sprocket-chain 53 also passes, so that as the gear-wheel 54 is rotated the sprocket-wheel 57 will be rotated in the opposite direction and will cause the sprocket-wheel 49 to be rotated in the same direction as the sprocket-wheel 57, thus causing the sprocket-chains to be driven so that that portion of the sprocket-chains which is above the boards 44 will move upwardly and rearwardly and cause the material which is thrown upon them to be moved in a corresponding direction.

Attached adjacent to the rear end of each of the boards 44 is a metallic protector 58, which is some distance above the rear end of the board to which it is attached and is substantially semicircular in shape, so that it extends downwardly and some distance at the rear of the shaft 48. This protector is inclined toward its forward end and is so arranged that the shock will be elevated a slight distance as it passes over this protector, and thus be thrown out of engagement with the prongs 51 on the sprocket-chains 50, and thus be allowed to fall onto the inclined platform 59, which is mounted behind the protectors 58. This platform is attached at its upper end to the connecting-piece 25, which is between the posts 22 and 23, and at their upper end downwardly to their lower end, which is a slight distance above the lower end of the conveyer-frame 31, as shown clearly in Fig. 2 of the drawings.

Mounted on the driving-shaft 10 and outside of the side piece 13 of the frame is a sprocket-wheel 60. Attached to the outside and near the forward end of the side piece 13 of the frame is a bracket 61, having the arms 62 and 63 thereon. Mounted between the arms 62 and 63 is the shaft 64, upon which the sprocket-wheels 65 and 66 are mounted. The supporting-bar 67 is also mounted on this shaft 64 and between the sprocket-wheels 65 and 66. This supporting-bar extends upwardly from its point of attachment to the shaft 64.

Pivotally attached to and extending upwardly from the side 14 of the frame is a supporting-bar 68, corresponding to the supporting-bar 67. Rotatably mounted in the upper ends of the supporting-bars 67 and 68 is a shaft 69, to which the gathering arms 70 are firmly attached. It will be seen that this shaft 69 is above the forward end of the frame when in a normal position. On the extreme end of the shaft 69 and outside of the supporting-bar 67 is a sprocket-wheel 71. Passed over the sprocket-wheel 71 and the sprocket-wheel 65 is a sprocket-chain 72, so arranged that as the sprocket-wheel 65 is driven the sprocket-wheel 71 will be correspondingly driven and the shaft 69 driven by the sprocket-wheel 71.

Passing over the sprocket-wheels 60 and 66 is the sprocket-chain 73, so arranged that as the sprocket-wheel 60 is driven the sprocket-wheel 66 will be driven, thus causing the sprocket-wheel 65 to be driven and thus rotate the shaft 69, and thus the gathering-arms 70 will be operated. The gathering-arms are arranged some distance apart on the shaft 69 and extend outwardly from said shaft and then curved at their outer ends, so that they are substantially semicircular in shape, and are thus arranged so that as they are rotated the pointed ends of said arms will not engage the shock of grain which is being moved onto the conveyer immediately behind the runners 39; but the rounded portions thereof will engage the upper portion of the shocks and cause said shocks to be drawn downwardly onto the conveyer, and behind the runners 39. In other words, the outer ends of the gathering-arms are bent rearwardly relative to their path of rotary movement.

Pivotally attached to the outside of the supporting-bar 67 is a rod 74, which is pivoted to the link 75, said link being attached to the shaft 76, which extends across the frame and is rotatably mounted in the braces 26. Pivotally attached to the link 75 and extending rearwardly therefrom is the rod 77, which is pivoted at its rear end to the lever 78, so that as the lever is swung on its pivot the link 75 will be swung and cause the pivot 76 to be rotated, thus causing the bar 67 to be swung on its pivot and move the gathering-arms 70 forwardly or rearwardly. Mounted on that portion of the shaft 76 which is outside of the brace 26 on the left side of the machine is a link similar to the link 75, having a rod similar to the rod 74, pivotally attached to the upper end of said link and also pivotally attached to the supporting-bar 68, thus causing the bar 68 to be rocked simultaneously with the bar 67. The lever 78 is maintained in position by means of a notched sector 79, coacting with a pawl which is connected with the lever 78 by means of a rod attached to the pawl and to a hand-piece which is pivotally attached to the lever 78 at its upper portion. The pawl is designed to rest in one of the notches of the notched sector 79 while the machine is in operation, and thus maintain the gathering-arms in a desirable position. This adjustment of the gathering-arms is particularly desirable owing to the fact that by swinging it forwardly or rearwardly it can be made to accommodate a large or small shock of grain, and thus prevent the breaking of the shock or the severing of the kernels from the head while the shock is being taken from the field and moved onto the conveyer which is behind the runners 39. The shaft upon which the gathering-arms are mounted is designed to be rotated in the direction shown by the arrow in Figs. 3 and 4 of the drawings.

Extending longitudinally of the frame and mounted midway between the rear portions of the sides 13 and 14 is the shaft 80, having the beveled gear-wheel 81 in mesh with the beveled portion 82 of the gear-wheel 54, so that as the gear-wheel 54 is rotated the shaft 80 will be rotated. Mounted on the extreme rear end of the shaft 80 is a sprocket-wheel 83, over which the sprocket-chain hereinafter described is designed to pass. Extending in the same direction and immediately above the shaft 80 is a shaft 84 upon which two sprocket-wheels 85 and 86 are mounted. Extending across the upper portion of the frame 31 is a shaft 87, upon which the sprocket-wheels 88 and 89 are mounted. The sprocket-wheel 90 is also mounted on the extreme rear end of the shaft 87. A sprocket-chain 91 is passed over the sprocket-wheel 90 and the sprocket-wheel 83, so that as the shaft 80 rotates the sprocket-wheel 83 the sprocket-wheel 90 will be driven, and thus cause the shaft 87 to be driven in a corresponding direction. A sprocket-chain 92 is passed over the sprocket-wheels 86 and 88 and above and below the frame 31. A sprocket-chain 93 is passed over the sprocket-wheels 85 and 89 and above and below the boards in the frame 31. The sprocket-chains 92 and 93 are connected by cross-pieces or raddles 94, so that a conveyer is formed by means of the raddle 94 and the sprocket-chains 92 and 93, and as the shaft 87 is driven the conveyer will be operated, and when the machine is in operation the conveyer will elevate the substance on that portion of it which is above the boards of the frame 31. This conveyer takes the shocks of grain which are delivered upon the platform and the lower portion of it by the conveyer which is immediately behind the runners 39 and elevates said shocks of grain, so that they will drop into a wagon which is being drawn beside the elevating-conveyer. This conveyer-frame of course will be made adjustable so as to be raised upwardly and downwardly at its outer end or may be made stationary, as is shown in the drawings; but as conveyers have been swung upwardly and downwardly in this way in various machines it is not deemed necessary to show the adjustable feature. The side boards 34 are all immediately outside of the conveyer which elevates the grain and throws it to one side of the frame of our machine.

Extending upwardly from each side board 34 is a post 95. Connecting these posts 95 and capable of vertical movement in them is a cross-piece 96, which moves upwardly and downwardly in a slot 97, which extends vertically of each of the posts 95. There is a spring 98, mounted in each of the slots 97, designed to normally hold the cross-piece 96 at its lower limit of movement and yet allow it to be forced upwardly a slight distance as the grain passes beneath it in the manner hereinbefore described.

Attached to and extending downwardly from the cross-piece 96 is a series of semicircular leaf-springs 99, each of said springs 99 having a bar 100 attached to its lower end, said bars 100 extending upwardly from their points of attachment above the boards forming the body of the frame and above the conveyer which elevates the grain to one side of the machine. Each of these bars 100 is supported near its upper end by means of a cord which is attached to it and to a wire 101 which extends across the upper portion of the frame 31 and is supported by the posts 102 and 103, which are attached to the side boards 34. These bars are mounted in the manner above set forth, so that as the grain which is on the conveyer beneath them is being elevated by said conveyer the shock of grain or the bundle in said shock will be forced downwardly against the conveyer, and therefore prevent the danger of the shocks of grain being dropped backwardly while they are being elevated regardless of the position of the conveyer. We have provided a set-screw 104 at the top of each of the posts 97, so that the tension of each of the springs 98 may be adjusted readily and easily, and thus enable the operator to adjust these springs, so that a bundle of greater or less size can be passed beneath the bars 100.

We have provided an ordinary mechanism 105 for throwing the entire working mechanism into and out of gear by the operation of a single lever 106, the upper portion of which is adjacent to the driver's seat.

In practical operation the horses are attached to the whiffletrees on each side of the machine as they are driven forwardly, the runners 39 will pass beneath the shock of grain, and said runners will force the grain upwardly a slight distance as they move beneath said shock. The gathering-arms 70, which are being rotated, will force the upper portion of the shock downwardly, and the conveyer behind the runners and the shock will be drawn upwardly by said conveyers and thrown rearwardly onto the platform 59 or to the lower end of the elevating and side-delivery conveyer at the rear of the machine. This conveyer will then carry the shock or bundles upwardly and drop them onto a wagon which is beneath the outer end of said conveyer. The device may also be used for elevating or loading hay or other substance of a similar character.

Having thus described our invention, what we claim, and desire to secure by Letters Patent of the United States therefor, is—

1. In a device of the class described, a series of runners, the outer ends of which are designed to slide over the ground-surface as the machine is advanced, a driven shaft extending across the machine and above said runners, gathering-arms on said shaft, and means for swinging said shaft forwardly and rearwardly to increase or diminish the distance between the gathering - arms and the runners.

2. In a device of the class described, a series of runners, the outer ends of which are designed to slide over the ground-surface as the machine is advanced, a driven shaft extended across the machine and above said runners, gathering-arms on said shaft, and means for swinging said shaft forwardly and rearwardly to increase or diminish the distance between the gathering - arms and the runners, for the purposes stated.

3. In a device of the class described, a series of runners, the outer ends of which are designed to slide over the ground-surface as the machine is advanced, means for adjusting said runners and maintaining them in position, a driven shaft extending across the machine and above said runners, gathering-arms on said shaft, and means for swinging said shaft forwardly and rearwardly to increase or diminish the distance between the gathering-arms and the runners, for the purposes stated.

4. In a device of the class described, a series of runners, gathering - arms rotatably mounted above said runners, curved with concave sides rearward with respect to the direction of rotation and designed when rotated to throw the top of a bundle of straw rearwardly and downwardly relative to the runners, and means for rotating said gathering-arms as the device is advanced over the ground-surface, and means for moving the gathering-arms forwardly or rearwardly, for the purposes stated.

5. In a device of the class described, the combination of a series of runners extending longitudinally of the device, a conveyer mounted partially above said runners and extending longitudinally of the device, gathering - arms mounted above the runners curved with concave sides rearward with respect to the direction of rotation and means for operatively connecting the conveyer with the main driving-shaft, and shields mounted near the rear of said conveyer, designed to raise the material elevated by the conveyer upwardly and out of engagement with it and allow said substance to fall rearwardly, and means for adjusting the gathering-arms toward or away from the runners.

6. In a device of the class described, the combination of a series of runners extending longitudinally of the device, a conveyer mounted partially above said runners and extending longitudinally of the device, gathering - arms mounted above the runners curved with concave sides rearward with respect to the direction of rotation and means for adjusting the gathering-arms forwardly or rearwardly, means for operatively connecting the conveyer with the main driving-shaft, the shields mounted near the rear of said conveyer, designed to raise the material elevated by the conveyer upwardly and out of engagement with it and allow said substance to fall rearwardly, an inclined platform mounted behind and partially beneath said shields, an elevating-conveyer having its lower end mounted beneath the lower end of said inclined platform designed to carry substance which has been dropped onto the inclined platform upwardly and to the side of the machine.

7. In a device of the class described, the combination of a series of runners extending longitudinally of the device, a driven conveyer mounted partially above and extending outwardly from said runners, an inclined platform at the rear of said conveyer, a second conveyer inclined upwardly and substantially at right angles to the first conveyer and mounted behind it, a series of springingly - mounted bars extending above said second conveyer designed to hold the material which is being elevated on it and a driven shaft extending across the machine and above said runners, gathering-arms on said shaft curved with concave sides rearward with respect to the direction of rotation and means for swinging the gathering-arms forwardly or rearwardly and for maintaining them in position, and a draft device on each side of the machine and immediately in front of each of the traction-wheels of the device.

8. In a device of the class described, the combination of a series of runners extending longitudinally of the device, a driven conveyer mounted partially above and extending outwardly from said runners, an inclined platform at the rear of said conveyer, a second conveyer inclined upwardly and substantially at right angles to the first conveyer and mounted behind it, a series of springingly - mounted bars extending above said second conveyer designed to hold the material which is being elevated on it, and a driven shaft extending across the machine, and above said runners, gathering-arms on said shaft curved with concave sides rearward with respect to the direction of rotation and means for swinging the gathering-arms forwardly or rearwardly and for maintaining them in position, and a draft device on each side of the machine and immediately in front of each of the traction-wheels of the device, and a bar on each side of the device to which the draft-animals are hitched.

9. In a device of the class described, traction-wheels having a driving-shaft mounted between said traction - wheels, a frame mounted on said shaft, said frame having rounded forward ends designed to engage and slide over the ground-surface as the machine is advanced, a caster designed to support the rear of said frame, runners mounted at the forward end of said frame, gathering-arms curved with concave sides rearward, with respect to the direction of rotation and mounted above said runners, means for adjusting the gathering-arms forwardly or rearwardly, means for operatively connecting the driving-shaft with the gathering-arms and a conveyer extending longitudinally of said frame and partially above said runners.

10. In a device of the class described, traction-wheels having a driving-shaft mounted between said traction-wheels, a frame mounted on said shaft, said frame having rounded forward ends designed to engage and slide over the ground-surface as the machine is advanced, a caster designed to support the rear of said frame, runners mounted at the forward end of said frame, gathering-arms curved with concave sides rearward with respect to the direction of rotation and mounted above said runners, means for moving the gathering-arms forwardly or rearwardly, means for operatively connecting the driving-shaft with the gathering-arms, and a conveyer extending longitudinally of said frame and partially above said runners, and an inclined platform at the rear of said conveyer, and an elevating-conveyer substantially at right angles to the first-mentioned conveyer having its lower end beneath the lower end of said inclined platform and substantially at right angles to the first-mentioned conveyer.

11. In a device of the class described, a frame mounted on traction-wheels, a series of runners at the front end of said frame, a series of inclined boards above and extending rearwardly from said runners, a series of conveyer-chains mounted between said boards, having prongs projecting outwardly therefrom, said boards and said conveyer-chains designed to form an elevating-conveyer, a driven shaft extending across the frame and above said runners, gathering-arms on said shaft curved with concave sides rearward with respect to the direction of rotation and means for moving the driven shaft forwardly or rearwardly, for the purposes stated.

12. In a device of the class described, a frame mounted on traction-wheels, a series of runners at the front end of said frame, a series of inclined boards above and extending rearwardly from said runners, a series of conveyer-chains mounted between said boards having prongs projecting outwardly therefrom, said boards and said conveyer-chains designed to form an elevating-conveyer, a driven shaft extending across the frame and above said runners, and gathering-arms on said shaft curved with concave sides rearward, with respect to the direction of rotation and means for swinging the driven shaft forwardly or rearwardly, an inclined platform at the rear of said conveyer, a second elevating-conveyer having its lower end beneath the lower end of said inclined platform, and means connected with the main driving-shaft for operating said second conveyer.

MICHAEL J. RODNEY.
JAMES J. FORD.
FRANK M. CONROY.
ABRAHAM BURSON.
FRED W. FITCH.

Witnesses:
GEO. A. CRAFT,
JAMES F. BRADY.